United States Patent
Mott et al.

(10) Patent No.: US 7,005,003 B2
(45) Date of Patent: *Feb. 28, 2006

(54) INKJET INKS HAVING CYAN, YELLOW, MAGENTA, AND/OR BLACK COLORANTS AND METHODS OF USING THE SAME TO PRODUCE BLACK AND WHITE IMAGES

(75) Inventors: James A Mott, San Diego, CA (US); David Tyvoll, La Jolla, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 126 days.

This patent is subject to a terminal disclaimer.

(21) Appl. No.: 10/460,482

(22) Filed: Jun. 11, 2003

(65) Prior Publication Data

US 2004/0250726 A1 Dec. 16, 2004

(51) Int. Cl.
*C09D 11/02* (2006.01)
*B05D 1/32* (2006.01)

(52) U.S. Cl. ..................... 106/31.6; 427/282
(58) Field of Classification Search ........... 106/31.6; 427/282
See application file for complete search history.

(56) References Cited

U.S. PATENT DOCUMENTS

| | | | |
|---|---|---|---|
| 5,803,958 A | 9/1998 | Katsen et al. | |
| 6,030,440 A * | 2/2000 | Sekioka et al. | 106/31.65 |
| 6,342,096 B1 | 1/2002 | Kurabayashi | |
| 6,378,974 B1 * | 4/2002 | Oelbrandt et al. | 347/15 |
| 6,459,501 B1 | 10/2002 | Holmes | |
| 6,676,738 B1 * | 1/2004 | Sano et al. | 106/31.75 |
| 6,726,758 B1 * | 4/2004 | Sano | 106/31.6 |
| 2002/0118265 A1 * | 8/2002 | Rose et al. | 347/100 |
| 2003/0056687 A1 | 3/2003 | Sano | |
| 2003/0144377 A1 * | 7/2003 | Sano et al. | 523/160 |
| 2004/0035320 A1 * | 2/2004 | Sano et al. | 106/31.6 |
| 2004/0216638 A1 * | 11/2004 | Rolly | 106/31.13 |

FOREIGN PATENT DOCUMENTS

| | | |
|---|---|---|
| EP | 0899311 | 3/1999 |
| EP | 1217047 | 6/2002 |
| JP | 2000318293 | 11/2000 |
| JP | 0222345079 | 12/2000 |

OTHER PUBLICATIONS

Small Gamut User Guide, Lyson Inc., www.lyson.com, 6 pps., no date available.

* cited by examiner

*Primary Examiner*—Helene Klemanski

(57) ABSTRACT

A gray inkjet ink having a black colorant and at least one cyan, magenta, or yellow colorant. By adjusting the amount of cyan, magenta, or yellow colorant in the inkjet ink, a gray inkjet ink having a neutral, warm, cool, or sepia tone is produced. At least one gray inkjet ink is used in a black ink set or an eight-color ink set to produce black and white images having high resolution. Methods of producing black and white images having desired gray tones are also disclosed.

24 Claims, 1 Drawing Sheet

INKJET INKS HAVING CYAN, YELLOW, MAGENTA, AND/OR BLACK COLORANTS AND METHODS OF USING THE SAME TO PRODUCE BLACK AND WHITE IMAGES

FIELD OF THE INVENTION

The present invention relates to ink-jet inks having cyan, magenta, yellow, or black colorants in an ink vehicle. The inkjet inks can be used to produce neutral, cool, warm, and sepia tones of gray.

BACKGROUND OF THE INVENTION

Black and white images having a high resolution, such as black and white photographs, are growing in popularity. Despite accounting for only a small percentage of the total images produced each year, photographers continue to produce black and white photographs using conventional silver halide techniques. The photographers are also adapting inkjet printing techniques to produce high resolution, black and white images. For instance, black and white images are printed using a color inkjet printer by applying inkjet inks of composite colors on the print medium. The color inkjet printer mixes cyan, magenta, yellow, and black inkjet inks on the print medium to achieve a composite black. To create gray tones, the cyan, magenta, yellow, and black inkjet inks are mixed in varying ratios on the print medium. One disadvantage of using color inkjet inks to print a black and white image is that the black and white image retains a non-neutral hue due to the intense colors of the color inkjet inks. Oftentimes, this hue deviates as a function of ink density. For example, as the ink density increases, the hue deviation from neutral can drift from a bluish hue to a rosy hue. In addition, the resolution of the black and white image is not as high as a black and white photograph because individual dots of the color inkjet ink are sometimes visible, especially in light areas of the image.

High resolution black and white images are printed by applying dots of inkjet ink adjacent to one another to create the desired shades of black and gray. Dithering is a process that simulates shades of gray by printing various sizes and shapes of dots adjacent to one another. Dithering reduces the contrast between dots of different shades and creates a more natural look between adjacent dots. Halftoning is a process of printing black and white images by printing dots of various sizes in an ordered array, such as on a fixed grid.

While artists typically desire the black and white image to have a neutral tone, artists sometimes want the black and white image to have a warm, cool, or sepia tone. As used herein a "neutral tone" is a tone that lacks chroma. A "warm tone" has a red or pink color, a "cool tone" has a blue, purple, or green color, and a "sepia tone" has a brown or yellow color. These tones are used to create a different mood in black and white images. Some photographers enhance their silver halide images using darkroom processes, such as platinum development baths, to create black and white image tones that deviate from neutral.

It would be desirable to produce high quality black and white images having a desired neutral, warm, or cool tone without using expensive, time consuming, and environmentally unfriendly photographic techniques. In addition, it would be desirable to improve the graininess and pixilation in black and white images. It would also be desirable to provide gray inkjet inks that are consistent at any dilution. Furthermore, it would be desirable to provide black and white images that are not negatively affected by particular lighting conditions.

BRIEF SUMMARY OF THE INVENTION

A gray inkjet ink comprising a black pigment and at least one cyan, magenta, or yellow pigment is disclosed. The total amount of pigment present in the gray inkjet ink is approximately 0.1 wt % to approximately 3.0 wt % of the total inkjet ink. The at least one cyan, magenta, or yellow pigment are present at less than approximately 1.5% by weight.

A black ink set comprising at least one gray inkjet ink is also disclosed. The at least one gray inkjet ink comprises a black colorant and at least one cyan, magenta, or yellow colorant.

An eight-color ink set for printing color and black and white images is disclosed. The eight-color ink set comprises a cyan, yellow, magenta, black, gray, light gray, light cyan, and light magenta inkjet ink. The gray and light gray inkjet inks comprise a black colorant and at least one cyan, magenta, or yellow colorant in an aqueous ink vehicle. The at least one cyan, magenta, or yellow colorant is present at less than approximately 1.5% by weight.

A method of producing a black and white image having a desired gray tone is also disclosed. The method comprises providing a multiple color ink set comprising at least one cyan, yellow, magenta, black, light cyan, light magenta, and gray inkjet ink. The at least one gray inkjet ink comprises a black colorant and at least one cyan, magenta, or yellow colorant in an aqueous ink vehicle. The at least one gray inkjet ink of the black ink set is applied to a print medium to produce the black and white image having a neutral, warm, cool, or sepia gray tone.

An additional method of producing a black and white image having a desired gray tone is disclosed. The method comprises providing an ink set having at least one color inkjet ink, a black inkjet ink, and at least one gray inkjet ink. The inkjet inks of the ink set are applied to a print medium to produce the black and white image having a neutral, warm, cool, or sepia gray tone.

BRIEF DESCRIPTION OF THE DRAWING

The accompanying drawing illustrates an embodiment of the present invention and is a part of the specification. The illustrated embodiment does not limit the scope of the invention.

In one embodiment of the present invention, the color space is depicted in FIG. 1 as a triangle and includes a neutral gray tone in the center and a sepia tone, a warm tone, and a cool tone in each corner of the triangle.

DETAILED DESCRIPTION OF THE INVENTION

Figure 1:
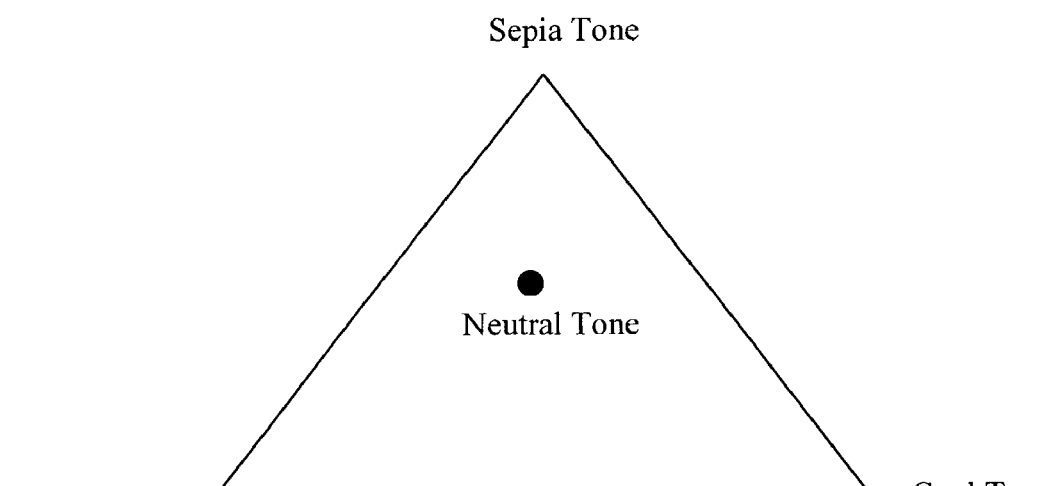

A gray inkjet ink having at least one colorant in an ink vehicle is disclosed. The inkjet ink includes a combination of cyan, magenta, yellow, or black colorants to produce a desired gray tone. By adjusting the amount of cyan, magenta, yellow, or black colorant in the ink vehicle, the inkjet ink has a neutral, warm, cool, or sepia tone when printed. The inkjet ink does not produce hue deviations or color casts when diluted to a low concentration.

The amounts of the components in the inkjet ink are expressed in weight percent ("wt %") of the total weight of the ink composition. The purity of all components is that used in normal commercial practice for inkjet inks.

The colorants in the inkjet ink may be dyes or pigments. If the colorant is a dye, the dye may be nonionic, cationic, anionic, or a mixture of nonionic, cationic, and/or anionic dyes. Dyes for use in inkjet inks are well known in the art and are commercially available from sources such as BASF, CIBA, and Sensient. The dye may be water-soluble or water-insoluble and may include an Acid, Direct, Food, Mordant, or Reactive dye. Specific examples of dyes that may be used include, but are not limited to, Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine O, Azure B, and Azure B Eosinate, all of which are available from Sigma-Aldrich Chemical Company (St. Louis, Mo.). Examples of anionic, water-soluble dyes include, but are not limited to, Direct Yellow 132, Direct Blue 199, Magenta 377 (available from Ilford AG, Switzerland), alone or together with Acid Red 52. Examples of water-insoluble dyes include azo, xanthene, methine, polymethine, and anthraquinone dyes. Specific examples of water-insoluble dyes include Ciba-Geigy Orasol Blue GN, Ciba-Geigy Orasol Pink, and Ciba-Geigy Orasol Yellow. Black dyes may include, but are not limited to, Direct Black 154, Direct Black 168, Fast Black 2, Direct Black 171, Direct Black 19, Acid Black 1, Acid Black 191, Mobay Black SP, and Acid Black 2. The dyes may be present in the inkjet ink from approximately 0 wt % to approximately 10 wt %.

Pigments for use in inkjet inks are also well known in the art and are commercially available from sources, such as BASF, Cabot Corp., CIBA, Clariant, Degussa, DuPont, Heubach, and Mobay Chemical Corp. If the colorant in the inkjet ink is a pigment, the pigment may include, but is not limited to, the following pigments available from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140. The following black pigments are available from Cabot: Monarch® 1400, Monarch® 1300, Monarch® 1100, Monarch® 1000, Monarch® 900, Monarch® 880, Monarch® 800, and Monarch® 700. The following pigments are available from CIBA: Chromophtal® Yellow 3G, Chromophtal® Yellow GR, Chromophtal® Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Degussa: Printex U, Printex V, Printex 140U, Printex 140V, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: Tipure® R-101. The following pigments are available from Heubach: Dalamar® Yellow YT-858-D and Heucophthal® Blue G XBT-583D. The following pigments are available from Clariant: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chemical: L74-1357 Yellow, L75-1331 Yellow, and L75-2577 Yellow. The following pigments are available from Columbian: Raven 7000, Raven 5750, Raven 5250, Raven 5000, and Raven 3500. The following pigment is available from Sun Chemical: LHD9303 Black.

In one embodiment, the cyan, yellow, magenta, or black pigments may be present from approximately 0.1 wt % to approximately 3.0 wt % of the total weight of the inkjet ink. However, it is also contemplated that dyes may be used. The colorants may be present in the ink vehicle in precise amounts because slight deviations in the amount of the colorants may change the tone of the inkjet ink from its neutral or other desired gray tone. However, as discussed in detail herein, the desired gray tone may also be achieved on the print medium by a color correction algorithm using additional color inkjet inks in the printer. If a black pigment is used in the inkjet ink, the pigment may be present from approximately 0.1 wt % to approximately 3.0 wt % of the total ink-jet ink. If a cyan pigment is used in the inkjet ink, the pigment may be present from approximately 0.01 wt % to approximately 1.0 wt % of the total inkjet ink. If a magenta pigment is used in the inkjet ink, the pigment may be present from approximately 0.005 wt % to approximately 1.0 wt % of the total inkjet ink. If a yellow pigment is used in the inkjet ink, the pigment may be present from approximately 0.01 wt % to approximately 1.0 wt % of the total inkjet ink.

The colorant used in the inkjet ink is not critical to the operability of the present invention. Therefore, the selection of dye or pigment is not discussed in detail herein. Rather, it is understood that one of ordinary skill in the art could select any suitable dye or pigment for use in the present invention.

The inkjet ink may include an aqueous-based ink vehicle and at least one cyan, magenta, yellow, or black colorant in the ink vehicle to produce a neutral, warm, cool, or sepia gray tone. In a dye-based inkjet ink, the dyes are soluble in the ink vehicle, while in a pigment-based inkjet ink, the pigments are dispersed in the ink vehicle. In one embodiment, a dark gray ink is produced using a black pigment while lighter gray inks are produced by using at least one cyan, magenta, yellow, or black pigment in the ink vehicle. For sake of example only, the inkjet ink may include predetermined amounts of the black pigment, the cyan pigment, and the magenta pigment to achieve the lighter gray tones. Since the inkjet ink may include varying amounts of the cyan, magenta, yellow, or black pigments, inkjet inks that produce a full range of gray tones when printed are possible.

The ink vehicle may include water or a mixture of water and at least one water-soluble organic solvent. The water-soluble organic solvent may include, but is not limited to, an aliphatic alcohol, an aromatic alcohol, a diol, a glycol ether, a poly(glycol) ether, a caprolactam, a formamide, an acetamide, and a long chain alcohol, or mixtures thereof. Examples of organic solvents employed in the practice of this invention include, but are not limited to, primary alcohols of 30 carbons or less, primary aromatic alcohols of 30 carbons or less, secondary aliphatic alcohols of 30 carbons or less, secondary aliphatic alcohols of 30 carbons or less, 1,3-alkyldiols of 30 carbons or less, alkyltriols of 30 carbons or less, 1,ω-alcohols of 30 carbons or less, ethylene glycol alkyl ethers, propylene glycol alkyl ethers, poly (ethylene glycol) alkyl ethers, higher homologs of poly (ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. For instance, solvents such as N-methylpyrrolidone, 1,5-pentanediol, 2-pyrrolidone, diethylene glycol, 1,3-(2-methyl)-propanediol, 1,3,5-(2-methyl)-pentanetriol, tetramethylene sulfone, 3-methoxy-3-methylbutanol, glycerol, 3-pyridyl-carbinol, pentaerythritol, 1,2-alkyldiols, and mixtures thereof may be used. The water-soluble organic solvent may be present in a range from approximately 0.01 wt % to approximately 50 wt % of the total weight of the inkjet ink, with approximately 0.1 wt % to approximately 30 wt % being preferred.

The inkjet ink may optionally include ingredients such as surfactants, humectants, polymers, corrosion inhibitors, pH adjusting agents, and biocides (anti-microbial agents, anti-fungal agents, etc.), depending on the desired properties of the inkjet ink. These components are known in the art and are not described in detail herein.

The inkjet ink may be formulated by incorporating at least one of the cyan, magenta, yellow, or black colorants into the ink vehicle, as known in the art. If the colorant is a soluble dye, the dye may be solubilized in the ink vehicle while if the colorant is an insoluble dye or a pigment, it may be dispersed in the ink vehicle by conventional methods.

Multiple gray inkjet inks, each having various amounts of cyan, magenta, yellow, and black colorants may be used to produce a black ink set, which is used to print a black and white image having the desired gray tone. For example, if a neutral tone is desired, each of the inkjet inks in the black ink set may produce a different density, but still neutral, tone of gray when printed. For instance, the ink set may include a dark gray ink, a medium gray ink, a light gray ink, and a very light gray ink to produce a black and white image having a neutral tone when printed. To obtain the neutral tone, the colorants may be present in the ink vehicle in precise amounts because slight errors in the amount of a specific colorant may cause the inkjet ink to deviate from its neutral tone. In another embodiment, the black ink set may include inkjet inks that produce the neutral gray tones most desired by users, such as those neutral gray tones that are most common in black and white images. In addition to the neutral, black ink set, a black ink set having gray inks that produce warm, cool, or sepia tones when printed is also contemplated. For sake of example only, the inkjet inks (i.e., the dark gray, medium gray, light gray, and very light gray) may include a higher amount of cyan pigment to produce a cool tone or a higher amount of magenta pigment to produce a warm tone.

By using the black ink set described herein, the graininess and the perceived resolution of the black and white images may be improved. For instance, the very light gray ink of the black ink set may be used to print the lightest tones of the black and white image while the dark gray ink may be used to print the darkest tones. By using the different gray inkjet inks to print the light and dark tones, individual dots of this ink will have less contrast against the print medium, which improves the resolution of the printed image.

An ink set having a plurality of color, black, and gray inks may also be used to achieve the neutral, warm, cool, or sepia tones. For example, an eight-color ink set including a black, cyan, magenta, yellow, light gray, light gray, light cyan, and light magenta inkjet ink. Since this ink set includes color ink-jet inks, it may be used to print high quality color images, in addition to printing neutral, warm, cool, and sepia toned black and white images. Since one ink set may be used to print both color and black and white images, the versatility of the eight-color ink set is increased in comparison to conventional ink sets. It is also contemplated that more or less than eight inks may be used. For example, fewer or additional gray inkjet inks may be used with the color and black inkjet inks.

The print medium upon which the inkjet inks of the present invention are printed may be conventional substrate that is used in printing photographic quality images. For instance, the print medium may be a coated paper, such as a photographic paper. Since the print medium is not critical to the operability of the present invention, its selection is not discussed in detail herein. Rather, it is understood that one of ordinary skill in the art could select any suitable print medium for use in the present invention.

The inkjet inks and ink sets described herein may be used in a printing system having an inkjet printer with multiple printheads and multiple ink pens. The inkjet printer may be a conventional inkjet printer, such as a thermal inkjet printer or a piezo-electric inkjet printer. The printing system may also include a print driver located on a computer that directs the operation of the inkjet printer. The print driver may be configured as known in the art and is operatively coupled to the inkjet printer to produce the printed images. Some of the printheads may contain the inkjet inks of the black ink set, which have a neutral, warm, cool, or sepia tone. The remaining printheads may contain black or color inkjet inks, such as light color inkjet inks having a reduced pigment load, or dark color inkjet inks having a full pigment load. For example, the color inkjet inks may include light cyan or light magenta inkjet inks or conventional cyan, magenta, or yellow inkjet inks having a full pigment load.

By operatively coupling the inkjet printer and the printer driver, the printing system may allow a neutral-toned black and white image to be printed on the print medium even if the black ink set deviates slightly from having an absolute neutral tone. In other words, the black ink set may produce a neutral-toned black and white image even if the inkjet inks themselves are not absolutely neutral. The printer driver may be used to adjust for deviations in the black ink set by color correction, which may be achieved by a color mapping adjustment via a calibration routine. Algorithms for color mapping and calibration routines are known in the art and are not discussed in detail herein. Since the black ink set may deviate from absolute neutrality, the black ink set may be manufactured to conventional specifications rather than being manufactured to tight specifications that are hard to achieve. The print driver may be configured to color correct the black ink set by printing the light color inkjet inks (i.e., light cyan or light magenta) in combination with the inkjet inks in the black ink set (i.e., the dark gray, medium gray, light gray, and very light gray inkjet inks). Ink sets having dark colors may also be used to color correct the black ink set to be absolutely neutral when printed.

In addition to printing a neutral tone, the printing system may be used to create a warm, cool, or sepia tone that is selected by the user. To achieve the selected tone, the gray inkjet inks of the eight-color ink set may be printed on the print medium in combination with the light or dark color inkjet inks. The dark color inkjet inks may adjust the hue in the high density areas of the black and white image and the light color inkjet inks may be used in low density areas to reduce graininess.

In use and operation, the print driver of the printing system may prompt the user to select a desired gray tone from a color space that illustrates possible gray tones. The color space is depicted in FIG. 1 as a triangle and includes a neutral gray tone in the center and a sepia tone, a warm tone, and a cool tone in each corner of the triangle. However, it is understood that the color space may depict different gray tones than those listed in FIG. 1. The user may choose the desired gray tone by utilizing conventional software selection processes (i.e., clicking the mouse on a desired point within an area representing the color space, adjusting RGB values on slider bars, etc.). The selected tone may be produced using an algorithm in the print driver that adjusts the color mapping. For example, the print driver may direct the inkjet printer to print predetermined amounts of each of the inkjet inks of the eight-color ink set. If a cool tone is desired, the print driver may direct the inkjet printer to print the gray inkjet inks in combination with the light cyan inkjet ink. If a warm tone is desired, the print driver may direct the inkjet printer to print the gray inkjet inks in combination with the light magenta inkjet ink.

The printing system may also permit the user to eliminate or reduce pseudo-metamerism effects observed under standard lighting conditions. By adjusting for pseudo-metamerism before the black and white image is printed, the desired tones may be achieved without printing multiple copies of the black and white image, which wastes time and material. The print driver in the printing system may prompt the user to select lighting conditions under which the black and white image is to be displayed. For sake of example only, the user may choose to display a sepia-toned image under gallery lighting. To correct for pseudo-metamerism in this image, the printing system may add light colors (i.e., light cyan or light magenta) to the printed image. Since the image is to be displayed under gallery lighting, the tones of the image may appear incorrect under any other lighting conditions. However, when the image is displayed under the correct lighting conditions, the desired tones are achieved. It is also contemplated that pseudo-metamerism in color images may be reduced in substantially the same manner.

EXAMPLES

Example 1

Inkjet Inks Having a Neutral Gray Tone When Printed

Four inkjet inks having the amounts (wt %) of black, cyan, and magenta pigments listed in Table 1 were produced. The black pigment was CAB-O-JET® 200, the cyan pigment was CAB-O-JET® 250, the magenta pigment was CAB-O-JET® 260, and the yellow pigment was CAB-O-JET® 270, all of which are available from Cabot Corp. (Boston, Mass.).

TABLE 1

Neutral Gray Ink Formulations Using Black, Cyan, and Magenta Pigments

| Ink | Dark Gray | Medium Gray | Light Gray | Very Light Gray |
|---|---|---|---|---|
| % Black Pigment | 2.75 | 0.60 | 0.29 | 0.14 |
| % Cyan Pigment | 0 | 0.16 | 0.07 | 0.03 |

TABLE 1-continued

Neutral Gray Ink Formulations Using Black, Cyan, and Magenta Pigments

| Ink | Dark Gray | Medium Gray | Light Gray | Very Light Gray |
|---|---|---|---|---|
| % Magenta Pigment | 0 | 0.04 | 0.01 | 0.01 |
| Total | 2.75 | 0.80 | 0.37 | 0.18 |

The pigments were dispersed in the ink vehicle by conventional methods. The inkjet inks also included 9% 2-pyrrolidinone, 2% 1,2-hexanediol, 3% Liponics ethoxylated glycol 1 (LEG-1), 0.2% Surfynol 104, and 0.2% Proxel. 2-pyrrolidinone and 1,2-hexanediol are available from Sigma-Aldrich Co. (St. Louis, Mo.); LEG-1 is available from Lipo Chemical Co. (Paterson, N.J.); Surfynol 104 is available from Air Products and Chemicals, Inc. (Allentown, Pa.); and Proxel is available from Avecia, Inc. (Wilmington, Del.).

Each of the four inkjet inks produced a neutral gray tone when printed on a heavyweight coated paper available from Hewlett-Packard Co. (Palo Alto, Calif.).

Example 2

Inkjet Inks Having a Cool Gray Tone When Printed

Four inkjet inks having the amounts (wt %) of black, cyan, and magenta pigments listed in Table 2 were produced. The pigments used in the inkjet inks were as described in Example 1.

TABLE 2

Cool Gray Ink Formulations Using Black, Cyan, and Magenta Pigments

| Ink | Dark Gray | Medium Gray | Light Gray | Very Light Gray |
|---|---|---|---|---|
| % Black Pigment | 2.75 | 0.60 | 0.29 | 0.14 |
| % Cyan Pigment | 0 | 0.18 | 0.08 | 0.04 |
| % Magenta Pigment | 0 | 0.03 | 0.01 | 0.01 |
| Total | 2.75 | 0.81 | 0.38 | 0.19 |

The pigments were dispersed in the ink vehicle by conventional methods. The inkjet inks also included 9% 2-pyrrolidinone, 2% 1,2-hexanediol, 3% Liponics ethoxylated glycol 1 (LEG-1), 0.2% Surfynol 104, and 0.2% Proxel.

Each of the four inkjet inks produced a cool gray tone when printed on heavyweight coated paper.

Example 3

Inkjet Inks Having a Warm Gray Tone When Printed

Four inkjet inks having the amounts of black, cyan, and magenta pigments listed in Table 3 were produced. The pigments used in the inkjet inks were as described in Example 1.

TABLE 3

Warm Gray Ink Formulations Using Black, Cyan, and Magenta Pigments

| Ink | Dark Gray | Medium Gray | Light Gray | Very Light Gray |
|---|---|---|---|---|
| % Black Pigment | 2.75 | 0.60 | 0.29 | 0.14 |
| % Cyan Pigment | 0 | 0.14 | 0.06 | 0.02 |
| % Magenta Pigment | 0 | 0.07 | 0.03 | 0.03 |
| Total | 2.75 | 0.81 | 0.38 | 0.19 |

The pigments were dispersed in the ink vehicle by conventional methods. The inkjet inks also included 9% 2-pyrrolidinone, 2% 1,2-hexanediol, 3% Liponics ethoxylated glycol 1 (LEG-1), 0.2% Surfynol 104, and 0.2% Proxel.

Each of the four inkjet inks produced a warm gray tone when printed on heavyweight coated paper.

Example 4

Inkjet Inks Having a Sepia Tone When Printed

Four inkjet inks having the amounts of black, cyan, and magenta pigments listed in Table 4 were produced. The pigments used in the inkjet inks were as described in Example 1.

TABLE 4

Sepia Gray Ink Formulations Using Black, Cyan, and Magenta Pigments

| Ink | Dark Gray | Medium Gray | Light Gray | Very Light Gray |
|---|---|---|---|---|
| % Black Pigment | 2.75 | 0.66 | 0.33 | 0.18 |
| % Cyan Pigment | 0 | 0.10 | 0.04 | 0.02 |
| % Magenta Pigment | 0 | 0.03 | 0.01 | 0.01 |
| Total | 2.75 | 0.79 | 0.38 | 0.21 |

The pigments were dispersed in the ink vehicle by conventional methods. The inkjet inks also included 9% 2-pyrrolidinone, 2% 1,2-hexanediol, 3% Liponics ethoxylated glycol 1 (LEG-1), 0.2% Surfynol 104, and 0.2% Proxel.

Each of the four inkjet inks produced a sepia tone when printed on heavyweight coated paper.

Having thus described certain preferred embodiments of the present invention, it is to be understood that the invention defined by the appended claims is not to be limited by particular details set forth in the above description, as many apparent variations thereof are possible without departing from the spirit or scope thereof as hereinafter claimed.

What is claimed is:

1. A gray inkjet ink, comprising:
    a black pigment, a yellow pigment, and at least one of a cyan pigment and a magenta pigment in an aqueous ink vehicle, wherein the at least one of the cyan pigment and the magenta pigment is present in a gray inkjet ink at less than approximately 1.5% by weight of a total weight of the gray inkjet ink, the gray inkjet ink being adapted to produce a cool gray tone, a warm gray tone, or a sepia gray tone when printed.

2. The gray inkjet ink of claim 1, wherein the cyan pigment is present in the gray inkjet ink at less than approximately 0.2% by weight.

3. The gray inkjet ink of claim 1, wherein the magenta pigment is present in the gray inkjet ink at less than approximately 0.1% by weight.

4. A black ink set for printing gray tones, comprising:
    a dark gray inkjet ink, a medium gray inkjet ink, a light gray inkjet ink, and a very light gray inkjet ink, each inkjet ink comprising a black pigment, a yellow pigment, and at least one of a cyan pigment and a magenta pigment in an aqueous ink vehicle, wherein the at least one of the cyan pigment and the magenta pigment is present at less than approximately 1.5% by weight of a total weight of the gray inkjet ink and wherein each of the dark gray inkjet ink, the medium gray inkjet ink, the light gray inkjet ink, and the very light gray inkjet ink is formulated to produce a cool gray tone, a warm gray tone, or a sepia gray tone when printed.

5. The black ink set of claim 4, wherein the cyan pigment is present in the dark gray inkjet ink, the medium gray inkjet ink, the light gray inkjet ink, or the very light gray inkjet ink at less than approximately 0.2% by weight.

6. The black ink set of claim 4, wherein the magenta pigment is present in the dark gray inkjet ink, the medium gray inkjet ink, the light gray inkjet ink, or the very light gray inkjet ink at less than approximately 0.1% by weight.

7. An eight-color ink set for printing color and black and white images, comprising:
    a cyan, yellow, magenta, black, gray, light gray, light cyan, and light magenta inkjet ink, wherein each of the gray inkjet ink and the light gray inkjet ink comprises a black pigment, a yellow pigment, and at least one of a cyan pigment and a magenta pigment in an aqueous ink vehicle, the at least one of the cyan pigment and the magenta pigment being present at less than approximately 1.5% by weight of a total weight of each of the gray inkjet ink and the light gray inkjet ink, wherein each of the gray inkjet ink and the light gray inkjet ink is formulated to produce a cool gray tone, a warm gray tone, or a sepia gray tone when printed.

8. The eight-color ink set of claim 7, wherein the cyan pigment is present in each of the gray inkjet ink and the light gray inkjet ink at less than approximately 0.2% by weight.

9. The eight-color ink set of claim 7, wherein the magenta pigment is present in each of the gray inkjet ink and the light gray inkjet ink at less than approximately 0.1% by weight.

10. A method of producing a black and white image having a desired gray tone, comprising:
    providing a black ink set comprising at least one gray inkjet ink, the at least one gray inkjet ink comprising a black pigment, a yellow pigment, and at least one of a cyan pigment and a magenta pigment in an aqueous ink vehicle, wherein the at least one of the cyan pigment and the magenta pigment is present at less than approximately 1.5% by weight of a total weight of the at least one gray inkjet ink; and
    applying the at least one gray inkjet ink of the black ink set to a print medium to produce a black and white image having a warm gray tone, a cool gray tone, or a sepia gray tone.

11. The method of claim 10, wherein providing a black ink set comprising at least one gray inkjet ink comprises providing the at least one gray inkjet ink to include the cyan pigment at less than approximately 0.2% by weight.

12. The method of claim 10, wherein providing a black ink set comprising at least one gray inkjet ink comprises providing the at least one gray inkjet ink to include the magenta pigment at less than approximately 0.1% by weight.

13. The method of claim 10, wherein providing a black ink set comprising at least one gray inkjet ink comprises adjusting the amounts of the black pigment, the yellow pigment and the at least one of the cyan pigment and the magenta pigment in the at least one gray inkjet ink to produce a black ink set having the warm gray tone, the cool gray tone, or the sepia gray tone when printed.

14. The method of claim 10, wherein providing a black ink set comprising at least one gray inkjet ink comprises providing multiple gray ink-jet inks, wherein each gray inkjet ink has a different amount of black pigment, magenta pigment, cyan pigment, and yellow pigment and a similar gray tone.

15. The method of claim 14, wherein providing a black ink set comprising at least one gray inkjet ink comprises providing a dark gray ink-jet ink, a medium gray inkjet ink, a light gray inkjet ink and a very light gray ink-jet ink.

16. The method of claim 10, wherein applying the at least one gray inkjet ink to a print medium to produce a warm gray tone, a cool gray tone, or a sepia gray tone comprises applying the dark gray inkjet ink, the medium gray inkjet ink, the light gray inkjet ink, and the very light gray inkjet inks to produce the warm gray tone, the cool gray tone, or the sepia gray tone.

17. The method of claim 10, further comprising color correcting the black and white image to produce the warm gray tone, the cool gray tone, or the sepia gray tone by applying color inkjet inks on the print medium.

18. The method of claim 17, further comprising enabling a user to select lighting conditions under which the black and white image is to be displayed to control for pseudo-metamerism effects.

19. A method of producing a black and white image having a desired gray tone, comprising:

providing an ink set having at least one color inkjet ink, a black inkjet ink, and at least one gray inkjet ink, wherein the at least one gray inkjet ink comprises a black pigment, a yellow pigment, and at least one of a cyan pigment, and a magenta pigment in an aqueous ink vehicle; and applying the inkjet inks of the ink set to a print medium to produce a black and white image having a warm gray tone, a cool gray tone, or a sepia gray tone.

20. The method of claim 19, wherein providing an ink set having at least one gray inkjet ink comprises providing at least one gray inkjet ink having a cool gray tone, a warm gray tone, or a sepia gray tone.

21. The method of claim 19, wherein providing an ink set having at least one color inkjet ink, a black inkjet ink, and at least one gray inkjet ink comprises providing a cyan, yellow, magenta, black, gray, light gray, light cyan, and light magenta inkjet ink.

22. The method of claim 19, wherein providing an ink set having at least one color inkjet ink comprises providing a light color inkjet ink or a dark color inkjet ink, wherein the light color inkjet ink has a reduced pigment load and the dark color inkjet ink has a full pigment load.

23. The method of claim 19, further comprising enabling a user to reduce pseudo-metamerism effects of the black and white image by selecting the lighting conditions.

24. The method of claim 19, further comprising color correcting the black and white image to produce the warm gray tone, the cool gray tone, or the sepia gray tone.

* * * * *